United States Patent [19]

Anderson et al.

[11] 4,085,160

[45] Apr. 18, 1978

[54] PRE-ACCELERATED RESIN COMPOSITION

[75] Inventors: Thomas F. Anderson; Arlington L. Hartless, both of Lake Jackson, Tex.

[73] Assignee: The Dow Chemical Company, Midland, Mich.

[21] Appl. No.: 731,980

[22] Filed: Oct. 14, 1976

Related U.S. Application Data

[63] Continuation-in-part of Ser. No. 574,155, May 2, 1975, abandoned.

[51] Int. Cl.² ........................ C08L 63/02; C08L 63/04
[52] U.S. Cl. ............................... 260/837 R; 260/836; 526/204
[58] Field of Search ............................ 260/837 R, 836

[56] References Cited

U.S. PATENT DOCUMENTS 3,773,856   11/1973   Takiyama et al. .................. 260/836

OTHER PUBLICATIONS

Chem. Abs., Seventh Collective Index, vols. 56–65, (1962–1966), Subjects Liv–NG, pp, 14, 526S, column 2, lines 17 and 18.

*Primary Examiner*—Harry Wong, Jr.
*Attorney, Agent, or Firm*—Albin R. Lindstrom

[57] ABSTRACT

Pre-accelerated vinyl ester resin compositions containing N-phenyl morpholine, for example, have exceptionally good storage stability and exhibit little or no drift in gel time over extended periods of storage. In combination with benzoyl peroxide as a catalyst, the resins cure readily at ambient temperature.

6 Claims, No Drawings

PRE-ACCELERATED RESIN COMPOSITION

CROSS-REFERENCE TO COPENDING APPLICATION

This application is a continuation-in-part of copending application U.S. Ser. No. 574,155 filed May 2, 1975, and now abandoned.

BACKGROUND

Resins of the kind called vinyl ester resins herein, when combined with catalysts and accelerators, have relatively short gel times, i.e., the time from addition of the catalyst to the setting up of the resin. However, with some conventional accelerators, e.g., N,N-dimethyl aniline, gel time may increase with time when the resin/accelerator system is stored (hereinafter referred to as gel time drift). Such systems become unworkable or impractical for extended periods of time. Other accelerators, such as cobalt naphthenate, decrease the resin storage life, i.e., the time until the resin (without catalyst) begins to set-up or gel.

It would be desirable to have an accelerator that can be added to the vinyl ester resin which would not show gel time drift on storage and at the same time would have good storage life. With such an accelerator, pre-accelerated resins could be produced which could be shipped to job sites where the addition and mixing of accelerators is difficult and subject to error. At the present time, N,N-dimethyl aniline is one of the most commonly used accelerators but because of the gel time drift during storage it is in many instances mixed with resin just before use and in quantities only sufficient for the immediate job.

SUMMARY OF THE INVENTION

The subject of this invention is a small class of morpholine derivatives which act as accelerators and can be premixed with the vinyl ester resin. The pre-accelerated vinyl ester resin has a relatively constant gel time for up to a year or more, does not gel prematurely and, in fact, has a longer storage life than the same resin without an accelerator.

The accelerator-stabilizers of this invention have the formula

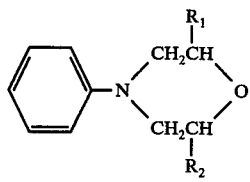

where $R_1$ and $R_2$ independently are hydrogen or a 1 to 4 carbon alkyl group, e.g., methyl or ethyl groups. N-phenyl morpholine is a preferred accelerator.

Resins which contain about 0.10 to 1.2 weight percent of the accelerator (based on the weight of resin plus any added copolymerizable monomers) have extended storage stability with little or no drift in gel time and cure readily when combined with a catalyst, such as benzoyl peroxide.

Vinyl ester resins which are combined with the accelerators are prepared generally by reacting an unsaturated monocarboxylic acid such as methacrylic acid in about equivalent amounts with a polyepoxide having more than one epoxide group per molecule. The resulting resin has terminal unsaturated vinyl groups and essentially no unreacted epoxide groups.

DESCRIPTION

Typical accelerators of the above formula include N-phenyl morpholine and certain N-phenyl morpholine derivatives having lower alkyl substituents on the morpholine ring, e.g., 2,6-dimethyl,N-phenyl morpholine. N-phenyl morpholine is a preferred accelerator.

Pre-accelerated resin compositions are prepared by mixing about 0.10 to about 1.2 weight percent of the accelerator with the resin, preferably about 0.2 to 0.7 percent. These proportions provide effective amounts of accelerator for the resin. Minor amounts of conventional accelerators may be employed in addition to accelerator of the present invention.

Generally, the vinyl ester resins are diluted with a copolymerizable monomer for reasons of economy and to obtain the desired working properties of the resin such as wettability and viscosity. Typical monomers include the alkenyl aromatic monomers such as styrene, vinyl toluene, the halogen-substituted styrenes, alkyl-substituted styrenes and the like. Styrene is preferred and is the most widely used monomer when the vinyl ester resins are used to prepare glass fiber reinforced articles such as pipe, tanks, conduit and the like or for use as cements and adhesives. However, for particular purposes, styrene may be partly or wholly replaced by other monomers such as vinyl toluene or acrylic and methacrylic acid esters which include both the saturated alcohol esters and hydroxyalkyl esters. The monomers may be mixed in any compatible proportions. Generally, with styrene for example, the monomer comprises about 20 to 60 weight percent of the resin-monomer mixture.

Modifying agents may be added to the resin for particular purposes. These agents include inert fillers such as sand, clay, $CaCO_3$, $TiO_2$, etc., reinforcing fibers, especially glass fiber, colorants and pigments, impact modifying materials such as elastomers, and the like.

The precatalyzed resins are generally cured by mixing them with a free radical yielding catalyst. An amount of catalyst is used which is sufficient to gel the resin but permit an adequate working time for the particular application and still give complete cure. This amount can range from about 0.5 to 5 weight percent. A large number of suitable catalysts are commercially available and well known. Benzoyl peroxide is a particularly preferred catalyst which is available in a powder, paste or suspension as a liquid. Usually the benzoyl peroxide is employed in the ratio of about 3 to 15 parts per part of accelerator depending on the resin used and conditions desired.

Vinyl ester resins are prepared by reacting an unsaturated monocarboxylic acid with a polyepoxide in about equivalent amounts, i.e., about one acid group per polyepoxide group. The preparation of vinyl ester resins, catalysts for the reaction, useful copolymerizable monomers, etc., are described in numerous patents. Typical of these patents is U.S. Pat. No. 3,377,406 which describes certain onium catalysts which may be used to prepare the resins which are called vinyl ester resins herein and which has an extensive disclosure as to types of polyepoxides, unsaturated acids, etc. Other patents which illustrate the state of the art are U.S. Pat. Nos. 3,179,623; 3,301,743; and 3,256,226. The above patents are relied on to show the state of the art with respect to the resins employed herein.

Briefly, any of the known polyepoxides may be used and include glycidyl polyethers of polyhydric phenols and polyhydric alcohols, epoxy novolacs and the like. Preferred polyepoxides are the bisphenol-based resins and epoxy novolacs which have epoxide equivalent weights of about 150 to 1000. Unsaturated acids include acrylic and methacrylic acids and their various substituted derivatives, cinnamic acid and the like. Also included are the dicarboxylic acid half esters of hydroxyalkyl acrylates as taught in U.S. Pat. No. 3,367,992.

Also included in the definition of vinyl ester resins are the modified resins in which the resin is post reacted with a dicarboxylic acid anhydride to form pendant half ester groups. Resins of this type are described in U.S. Pat. No. 3,564,074. The resins may also be modified by reaction with isocyanates, other anhydrides, and other reagents reactive with the hydroxyl group produced from the acid/epoxide primary resin-forming reaction. These modification reactions include reaction with up to all of the hydroxyl groups present in the vinyl ester resin.

The long storage life of the pre-accelerated vinyl ester resins makes it possible to effect cure of the resins in plants or on-the-job field sites merely by adding a catalyst. This eliminates the problems and safety hazards of having lesser skilled workers improperly mix potentially hazardous mixtures of accelerator and catalyst, which at the very least, can give poor product, and at the worst, can cause fires and explosions. The pre-accelerated resins are useful as field cements and adhesives, coating resins, field grouts, field laminating, field linings, shop putty and shop laminating resins.

The invention is further illustrated by the following nonlimiting examples. All parts and percentages are by weight unless otherwise specified.

EXAMPLES 1-3

A vinyl ester resin was prepared by reacting 16.6 parts of methacrylic acid with 21 parts of a bisphenol A based polyepoxide having an epoxide equivalent weight (EEW) of 186-192 and 59.8 parts of a bisphenol A based polyepoxide having an EEW of 475-575. The resin was then further reacted with 2.6 parts of maleic anhydride. The resin was then diluted with 45 percent styrene (Resin A).

Another vinyl ester resin was prepared by reacting 32.4 parts of methacrylic acid with 17.8 parts of a bisphenol A based polyepoxide having an EEW of 186-192 and 49.8 parts of an epoxy novolac having an EEW of 175-182. This resin was also mixed with 45 percent styrene (Resin B).

Resin C was a 50:50 mixture of Resin A and B.

Resins A, B and C were each mixed with 0.7 percent N-phenyl morpholine as an accelerator. The pre-accelerated resins were then stored at about 23° C and periodic samples were taken to determine the gel time.

To obtain a gel time for a given resin-accelerator sample, one part of such resin/accelerator system was admixed with four parts of sand (filler) containing 1.25 weight percent of powdered benzoyl peroxide and about 0.4 weight percent of an asbestos thixotropic agent. Thus each sample contained 0.7 percent N-phenyl morpholine and 5 percent of benzoyl peroxide. The sample was periodically stirred to determine when the pastelike mixture would no longer flow, i.e., peaks created by the stirrer could no longer be blended back into the mixture. The time from sand/catalyst addition to the point of no flow was recorded as gel time. Gel time was measured initially and after 3 months, 6 months and 10½ months of storage time. The table below gives the results.

| Ex. | Resin | GEL TIME-MINUTES | | | |
| --- | --- | --- | --- | --- | --- |
| | | Initial* | After 3 Mo. | After 6 Mo. | After 10¼ Mo. |
| 1 | A | 20-30 | 30 | 31 | 30 |
| 2 | B | 20-30 | 25 | 29 | 21 |
| 3 | C | 20-30 | 27 | 28 | 29 |

*Exact gel time was not obtained for initial samples. A check at 20 minutes showed the mixture had not begun to gel. However, at 30 minutes the resin mixture was beyond the no flow point.

Further, the resin/accelerator system samples were visually inspected prior to catalyst addition. Even after 10½ months, the samples were substantially fluid with only slight amount of gel in the bottom of the container. Past experience with Resin B shows that without accelerator it has a normal shelf life of about 3 months. Moreover, use of dimethyl aniline or cobalt naphthenate as the accelerator reduces the effective storage life to about 2 months.

COMPARATIVE EXAMPLES

For comparative purposes on gel time drift, a conventional accelerator, dimethyl aniline (DMA), was employed with Resin A of Example 1. The same catalyst, benzoyl peroxide, was admixed with the resin/accelerator system. Cobalt naphthenate (0.2 percent) was added as a surface drying agent. Although cobalt naphthenate is an accelerator in some systems, in this particular system it has negligible effect on gel time or gel time drift.

Because of the differences in activity, amounts of benzoyl peroxide/DMA were used to obtain a resin system which was functionally equivalent to the resin system of Example 1. Resin A was admixed with 0.05 percent DMA. Gel times initially and after one week, three weeks and one month of storage time were determined with the addition of 1.5 percent benzoyl peroxide. The table below shows the results.

| | GEL TIME, MINUTES | | | |
| --- | --- | --- | --- | --- |
| | Initially | After 1 week | After 3 weeks | After 1 month |
| Comparative Ex. | 46 | 50 | 100 | 128 |

Note that after only three weeks the gel time increased significantly. This drift can be minimized by addition of larger amounts of DMA, e.g., 0.15-0.20 percent. However, the resin system containing these relatively large amounts of DMA loses other necessary properties, such as working time and proper resin cure.

What is claimed is:

1. A polymerizable resin composition containing a polymerization accelerator and having a relatively constant gel time over extended periods of storage which comprises (1) a terminally unsaturated vinyl ester resin prepared by reacting an unsaturated monocarboxylic acid with a polyepoxide in about equivalent amounts (2) about 20 to about 60 weight percent of at least one unsaturated copolymerizable monomer and (3) about 0.10 to 1.2 weight percent based on the weight of said resin plus any copolymerizable monomers of an accelerator having the formula

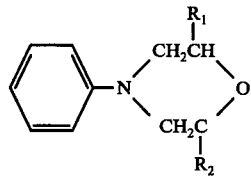

where $R_1$ and $R_2$ independently are H or a 1 to 4 carbon alkyl group.

2. The composition of claim 1 wherein the accelerator is present in about 0.2 to 0.7 weight percent.

3. The composition of claim 1 wherein the accelerator is N-phenyl morpholine.

4. The composition of claim 1 wherein said monomer is styrene.

5. The composition of claim 1 further containing benzoyl peroxide as a polymerization catalyst.

6. The composition of claim 1 wherein the catalyst is present in about 3 to 15 parts per part of accelerator.

* * * * *